US012353543B1

(12) United States Patent
Roundy et al.

(10) Patent No.: US 12,353,543 B1
(45) Date of Patent: Jul. 8, 2025

(54) SYSTEMS AND METHODS FOR UTILIZING MULTIPLE ANALYSIS TECHNIQUES TO DISTINGUISH STALKERWARE FROM PRIVACY-INVASIVE APPLICATION TYPES

(71) Applicant: GEN DIGITAL INC., Tempe, AZ (US)

(72) Inventors: Kevin Alejandro Roundy, Culver City, CA (US); Acar Tamersoy, Culver City, CA (US)

(73) Assignee: Gen Digital Inc., Tempe, AZ (US)

( * ) Notice: Subject to any disclaimer, the term of this patent is extended or adjusted under 35 U.S.C. 154(b) by 330 days.

(21) Appl. No.: 17/809,375

(22) Filed: Jun. 28, 2022

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
CPC .......... G06F 21/554; G06F 2221/033
See application file for complete search history.

(56) References Cited

U.S. PATENT DOCUMENTS

| 6,546,551 | B1* | 4/2003 | Sweeney | G06F 9/44521 |
| | | | | 717/148 |
| 11,366,903 | B1* | 6/2022 | Savant | G06F 21/54 |
| 2018/0025157 | A1* | 1/2018 | Titonis | H04W 12/128 |
| | | | | 726/22 |

OTHER PUBLICATIONS

Chatterjee et al., "The Spyware Used in Intimate Partner Violence", URL: https://ieeexplore.ieee.org/document/8418618, IEEE Symposium on Security and Privacy, Jul. 26, 2018, pp. 441-458.

* cited by examiner

*Primary Examiner* — Ayoub Alata
(74) *Attorney, Agent, or Firm* — Greenberg Traurig, LLP (57) ABSTRACT

The disclosed computer-implemented method for utilizing multiple analysis techniques to distinguish stalkerware from privacy-invasive application types may include (i) inspecting application package data associated with a target application, (ii) analyzing application marketplace data for the target application to determine descriptions of potential privacy-invasive actions, (iii) predicting, utilizing a program machine learning classifier, sensitive data leaks associated with the target application based on the application package data, (iv) predicting, utilizing a marketplace machine learning classifier, surveillance activities associated with the target application based on the descriptions of the potential privacy-invasive actions, and (v) performing a security action that assigns a privacy invasion category to the target application to distinguish the target application from stalkerware and other privacy invasion application types. Various other methods, systems, and computer-readable media are also disclosed.

20 Claims, 7 Drawing Sheets

| Target Application Description = Surveillance | Target Application Description = Sensitive Data Collection/Type | Target Application Collects Sensitive Data (Type) | Classification Result (Categories) |
|---|---|---|---|
| T | — | T | Stalkerware |
| T | — | F | Fake Surveillance Application |
| F | F | T | Spyware |
| F | F | F | Benign |
| F | T | — | Benign |

SYSTEMS AND METHODS FOR UTILIZING MULTIPLE ANALYSIS TECHNIQUES TO DISTINGUISH STALKERWARE FROM PRIVACY-INVASIVE APPLICATION TYPES

BACKGROUND

Privacy-invasive applications (e.g., stalkerware) may often take the form of mobile applications utilized by a malicious party for spying on another innocent party. For example, after being installed on an innocent party's mobile device, stalkerware may be configured to collect privacy sensitive information (e.g., the monitoring of a person's web browsing activity, computing device key logging, location recording, audio/video recording, etc.), for sending over a network where it may be retrieved at a later time by a malicious actor from a cloud storage or through physical access to the mobile device. In some instances, the privacy sensitive information may alternatively be silently collected and stored locally by a malicious actor with access to the mobile device.

Traditional approaches for detecting privacy-invasive applications often utilize analysis techniques that detect similar behavior exhibited by applications in a variety of different categories. For example, conventional analysis techniques may be configured to identify applications that collect large amounts of user data from mobile devices as privacy-invasive. Unfortunately, as these analysis techniques are unable to disambiguate between various application categories, user notifications fail to inform as to whether a detected privacy-invasive application is stalkerware, spyware, other malware application, or even a benign (i.e., non-malicious) application. For example, a legitimate mapping application that frequently tracks user location data and send this data to a cloud server may exhibit similar behavior (e.g., through the collection of large amounts of data) as a stalkerware application or spyware application. As a result, users concerned about a particular privacy-invasive application category (e.g., stalkerware) have no way of discerning the intent of applications that may be detected utilizing conventional analysis techniques.

SUMMARY

As will be described in greater detail below, the present disclosure describes various systems and methods for utilizing multiple analysis techniques to distinguish stalkerware from privacy-invasive application types.

In one example, a method for utilizing multiple analysis techniques to distinguish stalkerware from privacy-invasive application types may include (i) inspecting, by one or more computing devices, application package data associated with a target application, (ii) analyzing, by the one or more computing devices, application marketplace data for the target application to determine one or more descriptions of potential privacy-invasive actions, (iii) predicting, by the one or more computing devices and utilizing a program machine learning classifier, one or more sensitive data leaks associated with the target application based on the application package data, (iv) predicting, by the one or more computing devices and utilizing a marketplace machine learning classifier, surveillance activities associated with the target application based on the descriptions of the potential privacy-invasive actions, and (v) performing, by the one or more computing devices, a security action that assigns a privacy invasion category to the target application to distinguish the target application from among a plurality of invasive application types comprising stalkerware and other privacy invasion application types.

In some examples, the application package data may be inspected by inspecting target application source code and target application libraries utilized for providing target application functionality. In some examples, the application marketplace data analysis may include analyzing target application titles, target application descriptions, target application screenshots, and/or target application developer information. In some examples, the descriptions of the privacy-invasive actions may include target application surveillance actions and personal data collection performed by the target application.

In some examples, the prediction of the sensitive data leaks may include determining a privacy information type associated with the sensitive data leaks. In some examples, the prediction of the surveillance activities may include (i) identifying a sensitive data collection action in the descriptions of the potential privacy-invasive actions and (ii) determining a privacy information type associated with sensitive data collection action.

In some examples, the security action that assigns a privacy invasion category to the target application may include (i) determining whether the descriptions of the potential privacy-invasive actions include surveillance activity, (ii) determining whether the descriptions of the potential privacy-invasive actions include sensitive data collection and identify sensitive data types, and (iii) determining whether the sensitive data leaks are associated with the target application. In one example, a stalkerware category may be assigned to the target application upon determining that the descriptions of the potential privacy-invasive actions include the surveillance activity and upon determining that the sensitive data leaks are associated with the target application. Additionally, a fake surveillance application category may be assigned to the target application upon determining that the descriptions of the potential privacy-invasive actions include the surveillance activity and upon determining that the sensitive data leaks are not associated with the target application. Additionally, a spyware category may be assigned to the target application upon determining that the descriptions of the potential privacy-invasive actions do not include the surveillance activity, upon determining that the descriptions of the potential privacy-invasive actions do not include sensitive data collection, and upon determining that the sensitive data leaks are associated with the target application.

In one embodiment, a system for utilizing multiple analysis techniques to distinguish stalkerware from privacy-invasive application types may include at least one physical processor and physical memory that includes computer-executable instructions and a set of modules that, when executed by the physical processor, cause the physical processor to (i) inspect, by an inspection module, application package data associated with a target application, (ii) analyze, by an analysis module, application marketplace data for the target application to determine one or more descriptions of potential privacy-invasive actions, (iii) predict, by a program machine learning classification module, one or more sensitive data leaks associated with the target application based on the application package data, (iv) predict, by a marketplace machine learning classification module surveillance activities associated with the target application based on the descriptions of the potential privacy-invasive actions, and (v) perform, by a security module, a security action that assigns a privacy invasion category to the target application to distinguish the target application from among a plurality of invasive application types comprising stalkerware and other privacy invasion application types.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) inspect application package data associated with a target application, (ii) analyze application marketplace data for the target application to determine one or more descriptions of potential privacy-invasive actions, (iii) predict, utilizing a program machine learning classifier, one or more sensitive data leaks associated with the target application based on the application package data, (iv) predict, utilizing a marketplace machine learning classifier, surveillance activities associated with the target application based on the descriptions of the potential privacy-invasive actions, and (v) perform a security action that assigns a privacy invasion category to the target application to distinguish the target application from among a plurality of invasive application types comprising stalkerware and other privacy invasion application types.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing multiple analysis techniques to distinguish stalkerware from privacy-invasive application types. As will be described in greater detail below, the systems and methods described herein may categorize privacy-invasive applications by utilizing machine learning classifiers to enable program analysis techniques (i.e., static and/or dynamic), along with an analysis of mobile application self-descriptions/advertisements from an application marketplace or websites, to distinguish between benign applications, stalkerware applications, and/or other classes of privacy-invasive applications to establish intent. By utilizing the aforementioned analysis techniques in this way, the systems and methods herein may disambiguate between multiple privacy-invasive and other forms of heavy data collection applications to assist users through the use of precise malicious application warnings. Thus, the systems and methods described herein provide an advantage over traditional approaches for detecting privacy-invasive applications, which are often limited to only delivering notifications of these applications without identifying specific application categories. In addition, the systems and methods described herein may improve the field of computing device security by identifying specific types of malware on mobile computing devices that collect sensitive data stored on these devices for use by malicious actors.

Figure 1:
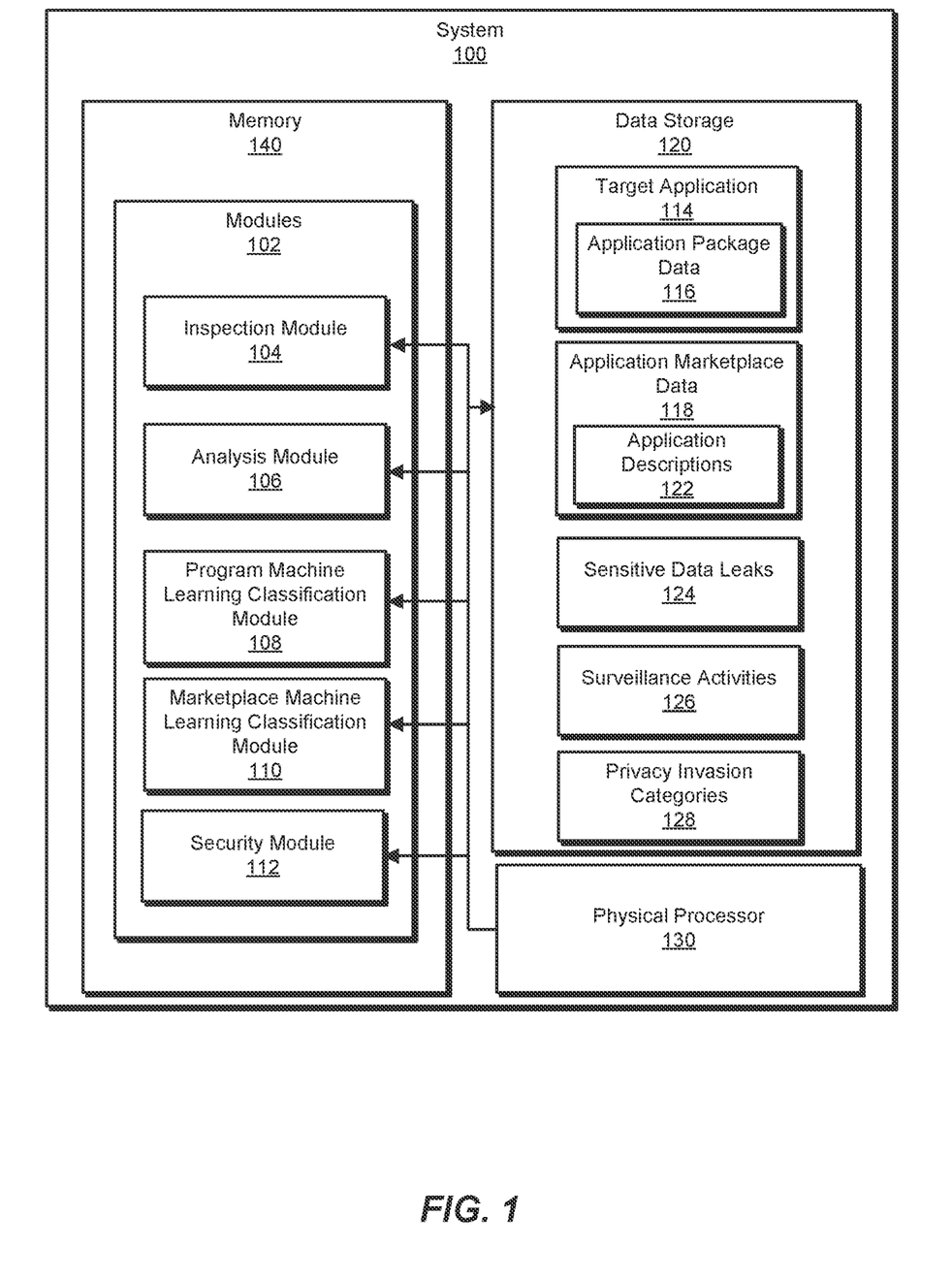
FIG. 1 is a block diagram of an example system for utilizing multiple analysis techniques to distinguish stalkerware from privacy-invasive application types.
Figure 2:
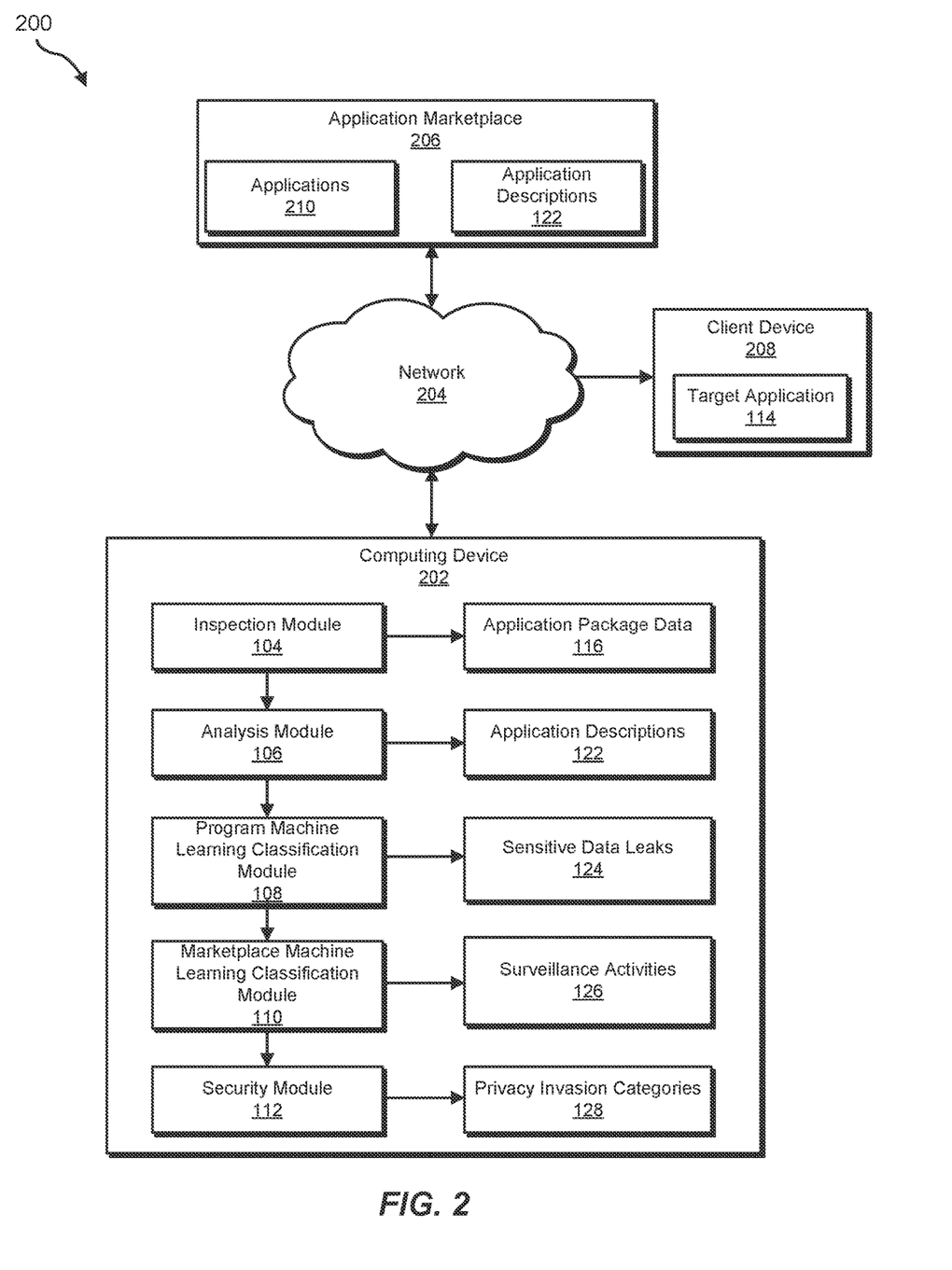
FIG. 2 is a block diagram of an additional example system for utilizing multiple analysis techniques to distinguish stalkerware from privacy-invasive application types.

The following will provide, with reference to FIGS. 1-2, detailed descriptions of example systems for utilizing multiple analysis techniques to distinguish stalkerware from privacy-invasive application types. Detailed descriptions of corresponding computer-implemented methods will also be provided in connection with FIG. 3. Additionally, a detailed description of example archive and marketplace data utilized by the example systems of FIGS. 1-2 will also be provided in connection with FIG. 4. Additionally, a detailed description of a classification table of privacy-invasive application types generated by the example systems of FIGS. 1-2 will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing multiple analysis techniques to distinguish stalkerware from privacy-invasive application types. As illustrated in this figure, example system 100 may include one or more modules 102 for performing one or more tasks. For example, and as will be explained in greater detail below, example system 100 may include an inspection module 104 that inspects application package data 116 associated with a target application 114. Example system 100 may additionally include an analysis module 106 that analyzes application marketplace data 118 for target application 114 to determine descriptions (i.e., application descriptions 122) of potential privacy-invasive actions. Example system 100 may also include a program machine learning classification module 108 that predicts sensitive data leaks 124 associated with target application 114 based on application package data 116. Example system 100 may additionally include a marketplace machine learning classification module 110 that predicts surveillance activities 126 associated with target application 114 based on application descriptions 122. Example system 100 may also include a security module 112 that assigns privacy invasion categories 128 to distinguish target application 114 from stalkerware and other privacy invasion application types (e.g., spyware). Although illustrated as separate elements, one or more of modules 102 in FIG. 1 may represent portions of a single module or application.

The term "target application," as used herein, generally refers to any mobile or web-based application that may be utilized on a computing device having data collection capabilities. Example data collection applications may include benign applications (such as mapping applications, calendar applications, e-mail applications etc.), non-interpersonal spyware applications (e.g., identity and account theft applications utilized for malicious purposes), and stalkerware applications utilized for uninvited surveillance activities (e.g., targeted spying) against users.

The term "machine learning classification," as used herein, generally refers to the application of binary and/or multi-label machine learning classifiers for generating predictive outputs based on received input data. In some examples, a machine learning classifier may be trained utilizing application marketplace descriptions and/or websites to generate a predictive output as to whether a particular application advertises itself as a surveillance spying application and identify types of personal data collected by the application based on its marketplace description. Additionally, a machine learning classifier may be trained with application application package data (e.g., source code and libraries) to generate a predictive output as to whether an application leaks privacy-sensitive information and determine the types of privacy-sensitive information that is leaked.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing multiple analysis techniques to distinguish stalkerware from privacy-invasive application types. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store target application 114 (including application package data 116) and application marketplace data 118 (including application descriptions 122). Data storage 120 may also store data describing sensitive data leaks 124, surveillance activities 126, and privacy invasion categories 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with application marketplace 206 and client device 208 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to utilize multiple analysis techniques to distinguish stalkerware from privacy-invasive application types.

For example, inspection module 104 may inspect application package data 116 associated with target application 114. Next, analysis module 106 may analyze application marketplace data 118 for target application 114 to determine application descriptions 122 of potential privacy-invasive actions. Then, program machine learning classification module 108 may predict sensitive data leaks 124 associated with target application 114 based on application package data 116. Next, marketplace machine learning classification module 110 may predict surveillance activities 126 associated with target application 114 based on application descriptions 122. Finally, security module 112 may perform a security action that assigns a privacy invasion category 128 to target application 114 to distinguish target application 114 from stalkerware and other privacy invasion application types.

Computing device 202 generally represents any type or form of computing device capable of reading and/or executing computer-executable instructions. In some examples, computing device 202 may be a security server that provides threat protection services. Additional examples of computing device 202 include, without limitation, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another.

Network 204 generally represents any medium or architecture capable of facilitating communication or data transfer. In one example, network 204 may facilitate communication between computing device 202, application marketplace 206, and client device 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Application marketplace 206 generally represents any type or form of computing device capable of reading and/or executing computer-executable instructions. In some examples, application marketplace 206 may be an application server that provides mobile applications (e.g., applications 210 (which may include target application 114)) for installation on client computing devices (e.g., client device 208). Additional examples of application marketplace 206 include, without limitation, web servers, storage servers, and/or database servers configured to run certain software applications and/or provide various security, web, storage, and/or database services. Although illustrated as a single entity in FIG. 2, application marketplace 206 may include and/or represent a plurality of servers that work and/or operate in conjunction with one another.

Client device 208 generally represents any type or form of computing device capable of reading computer-executable instructions. In some examples, client device 208 may be an endpoint device running client-side security software for monitoring various threats caused by malicious mobile applications. Additional examples of client device 208 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Figure 3:
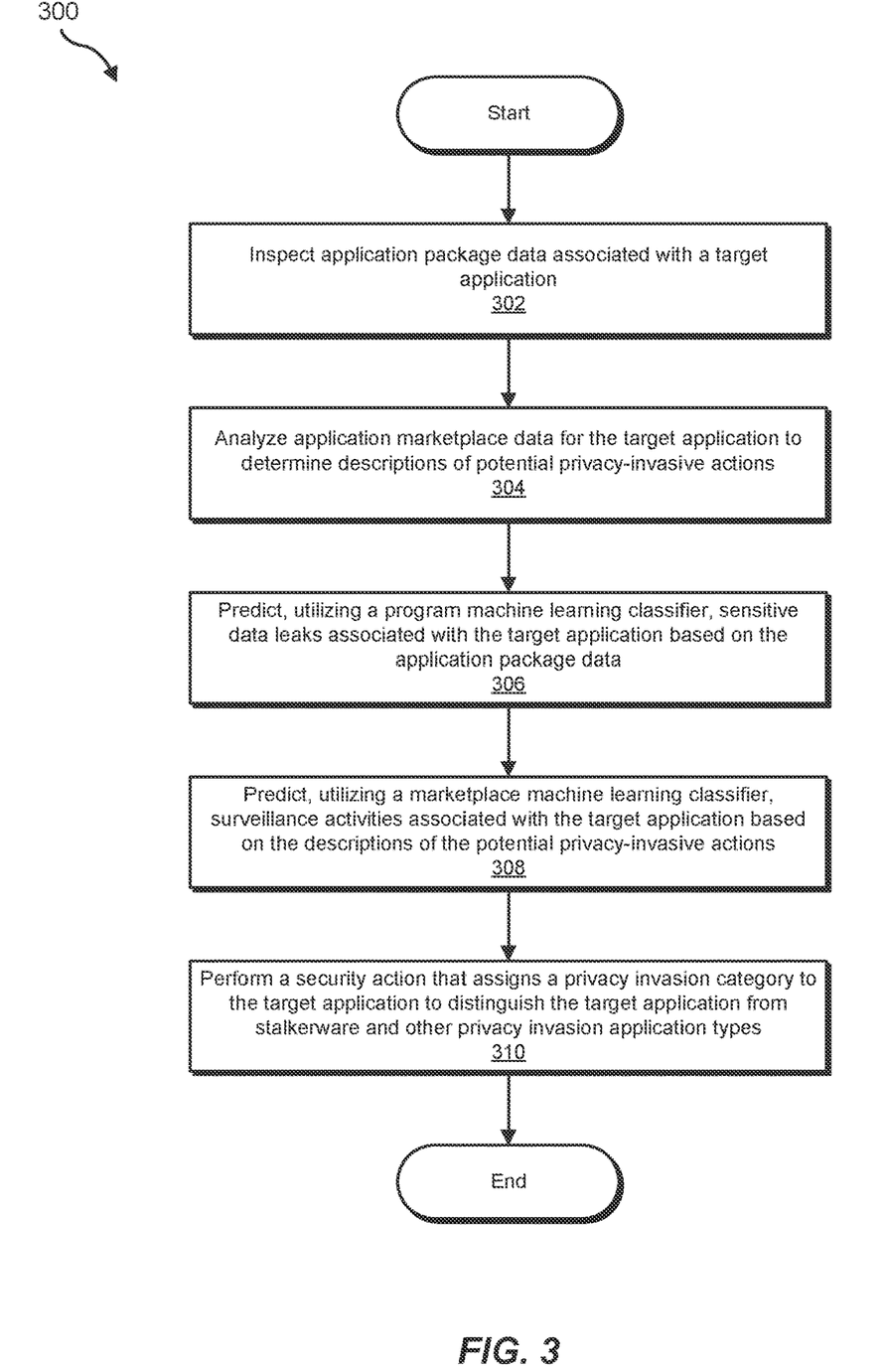
FIG. 3 is a flow diagram of an example method for utilizing multiple analysis techniques to distinguish stalkerware from privacy-invasive application types.

FIG. 3 is a flow diagram of an example computer-implemented method 300 for utilizing multiple analysis techniques to distinguish stalkerware from privacy-invasive application types. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may inspect application package data associated with a target application. For example, inspection module 104 may, as part of computing device 202 in FIG. 2, inspect application package data 116 associated with target application 114.

Figure 4:
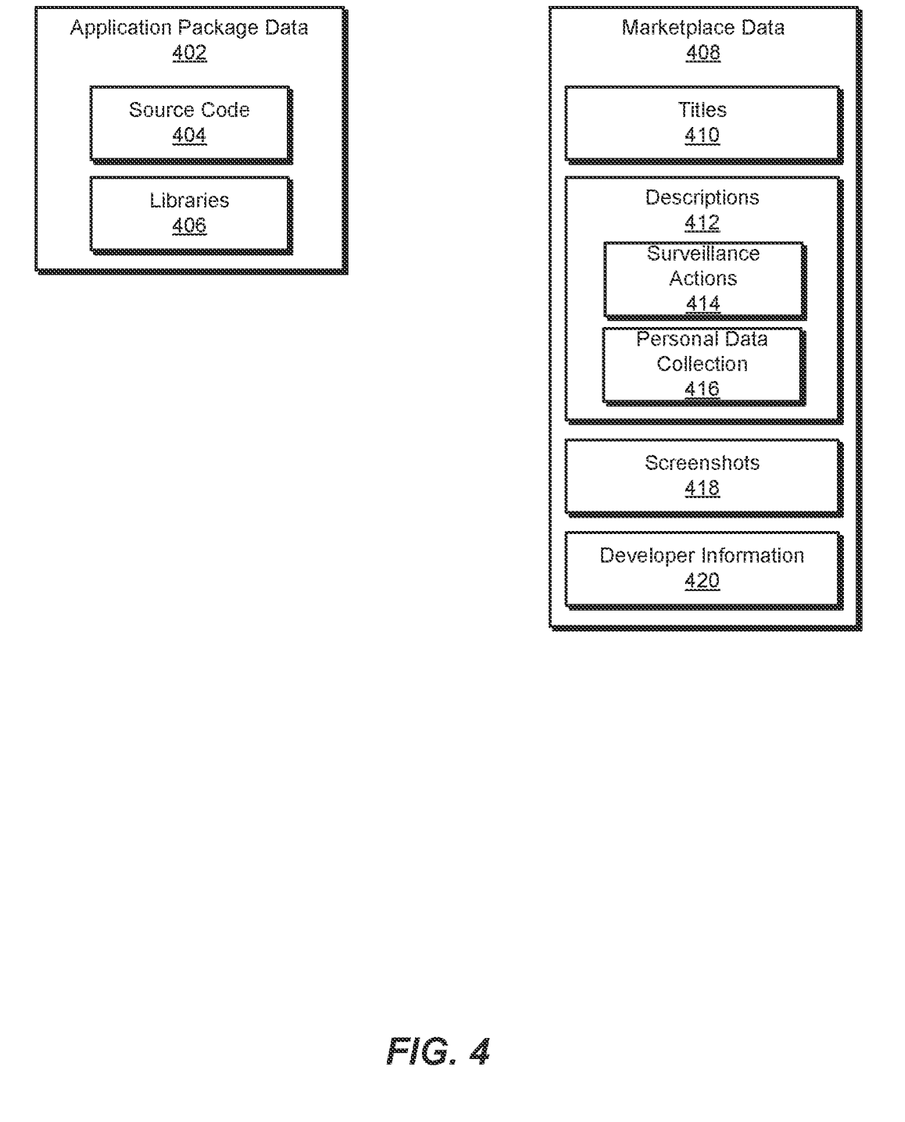
FIG. 4 is a block diagram of example archive and marketplace data utilized by the example systems of FIGS. 1-2.

Inspection module 104 may inspect application package data 116 in a variety of ways. In some examples, inspection module 104 may inspect target application source code (e.g., source code 404 in application package data 402 as shown in FIG. 4) and target application libraries (e.g., libraries 406 in application package data 402 as shown in FIG. 4) utilized for providing target application 114 functionality. In some examples, application package data 116 may be an apk file (which is essentially an archive file comprised of the necessary source codes and libraries for target application 114 to function properly).

At step 304, one or more of the systems described herein may analyze, application marketplace data for the target application to determine descriptions of potential privacy-invasive actions. For example, analysis module 106 may, as part of computing device 202 in FIG. 2, analyze application descriptions 122 on application marketplace 206 to identify an application description 122 associated with a potential privacy-invasive action.

Analysis module 106 may analyze application descriptions 122 in a variety of ways. In some examples (and as shown in FIG. 4), analysis module 106 may analyze marketplace data 408 to identify titles 410, descriptions 412, screenshots 418, and/or developer information 420 associated with target application 114. In some examples, descriptions 412 may include surveillance actions 414 and personal data collection 416.

At step 306, one or more of the systems described herein may predict, utilizing a program machine learning classifier, sensitive data leaks associated with the target application based on the application package data. For example, program machine learning classification module 108 may, as part of computing device 202 in FIG. 2, predict sensitive data leaks 124 associated with target application 114 based on application package data 116.

Program machine learning classification module 108 may predict sensitive data leaks 124 in a variety of ways. In some examples (and as shown in FIG. 4), analysis module 106 may predict sensitive data leaks 124 by determining a privacy information type (e.g., personal or non-interpersonal data) associated with sensitive data leaks 124. In some examples, program machine learning classification module 108 may be binary machine learning classifier configured to predict whether a given application (e.g., target application 114) leaks any privacy sensitive information. Additionally, program machine learning classification module 108 may be a multi-label machine learning classifier configured to determine the types of privacy sensitive information leaked by target application 114. In some examples, a variety of program analysis techniques may be utilized to facilitate detecting whether target application 114 collects and disseminates privacy-sensitive data over a network. In some examples, these techniques may include performing a dynamic analysis which tags sources of privacy sensitive data and tracks the flow of this data through target application 114 as it executes, raising an alarm if sensitive data is sent over the network. Other techniques may include tracking methods that may achieve similar results including, but not limited to, application virtualization and registering as a VPN on a mobile device and performing traffic introspection. Additionally or alternatively, static analysis techniques may be utilized to identify similar privacy sensitive data flows in the target application 114 program's control flow graph. In some examples, a static analysis may also extract features from a mobile device operating system API (such as API calls made by target application 114) and feed them as an input to a program machine learning classifier module 108.

At step 308, one or more of the systems described herein may predict, utilizing a marketplace machine learning classifier, surveillance activities associated with the target application based on the descriptions of the potential privacy invasive actions. For example, marketplace machine learning classification module 110 may, as part of computing device 202 in FIG. 2, predict surveillance activities 126 associated with target application 114 based on application marketplace data 118 including application descriptions 122.

Marketplace machine learning classification module 110 may predict surveillance activities 126 in a variety of ways. In some examples, marketplace machine learning classification module 110 may identify a sensitive data collection action in application marketplace data 118 (e.g., titles 410, descriptions 412, screenshots 418, and/or developer information 420) for target application 114. Then, marketplace machine learning classification module 110 may determine a privacy information type (e.g., personal or non-interpersonal data) associated with the sensitive data collection action. In some examples, an application description 122 may include self-advertisements including statements of an intended use case for target application 114 as well as application features conveyed by the application developer. For example, stalkerware application descriptions may overtly announce surveillance capabilities as a key use case where as generic non-interpersonal spyware may perform surveillance activities in secret. In some examples, marketplace machine learning classification module 110 may be a binary machine learning classifier configured to predict whether target application 114 advertises itself (i.e., in a corresponding application description 122 in application marketplace 206) as a spying/surveillance application. Additionally, marketplace machine learning classification module 110 may be a multi-label machine learning classifier configured to determine the types of privacy sensitive information leaked by target application 114.

At step 310, one or more of the systems described herein may perform a security action that assigns a privacy invasion category to the target application to distinguish the target application from stalkerware and other privacy invasion application types. For example, security module 112 may, as part of computing device 202 in FIG. 2, assign a privacy invasion category 128 to target application 114.

Figure 5:
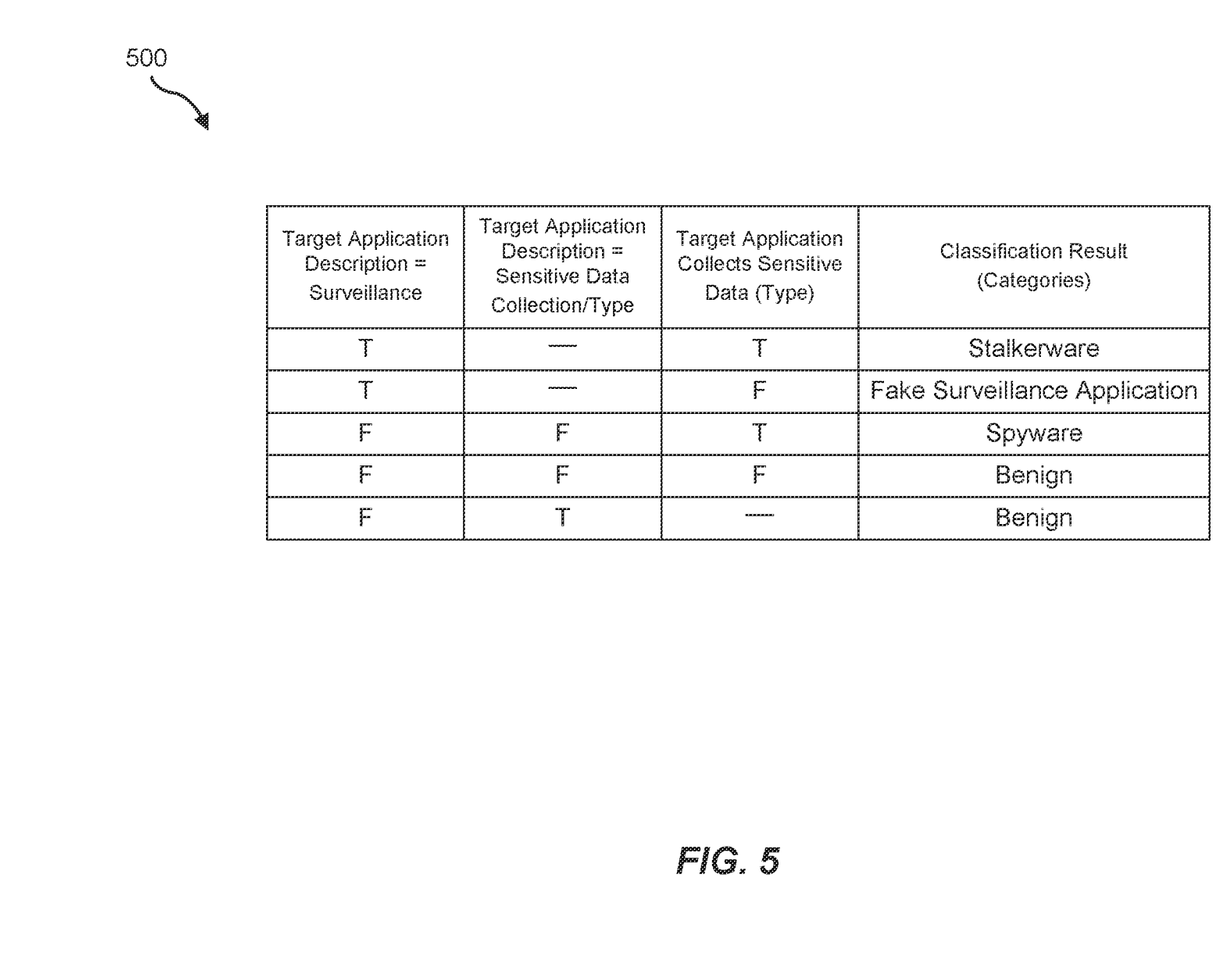
FIG. 5 is a classification table of privacy-invasive application types generated by the example systems of FIGS. 1-2.

Security module 112 may assign a privacy invasion category 128 to target application 114 in a variety of ways which will now be described with respect to FIG. 5. Turning now to FIG. 5, a classification table 500 that may be generated by security module 112 is shown. As shown in table 500, various privacy invasion categories are shown in the Classification Result (Categories) column including stalkerware, fake surveillance application (i.e., an application seeking to attract downloads by falsely claiming to be stalkerware but which actually only functions as a stalkerware program user-guide or an index of spying applications without performing any associated functionality), spyware, and benign.

As further shown in table 500, privacy invasion categories 128 may be determined based on table entries "true (T)" and "false (F)" representing responses to questions associated with the program analysis and application marketplace analysis described above with respect to steps 302-308 of FIG. 3 with blank entries (i.e., underscores) representing question responses that do not affect a category designation. For example, the questions may include (i) whether the descriptions of potential privacy invasive actions include surveillance activity, whether the descriptions of the potential privacy invasive actions include sensitive data collection and identify sensitive data types, and whether sensitive data leaks are associated with target application 114.

As shown in table 500, if the descriptions of potential privacy invasive actions include surveillance activity and sensitive data leaks are associated with target application 114 (i.e., "T" entries in columns 1 and 3), then a stalkerware category is assigned to target application 114. Alternatively, if the descriptions of potential privacy invasive actions include surveillance activity and sensitive data leaks are not associated with target application 114 (i.e., a "T" entry in column 1 and an "F" entry in column 3), then a fake surveillance application category is assigned to target application 114. Alternatively, if the descriptions of potential privacy invasive actions do not include surveillance activity or sensitive data collection but do include sensitive data leaks associated with target application 114 (i.e., an "F" entry in columns 1-2 and a "T" entry in column 3), then a spyware category is assigned to target application 114. Alternatively, if the descriptions of potential privacy invasive actions do not include surveillance activity, sensitive data collection, or sensitive data leaks associated with target application 114 (i.e., an "F" entry in columns 1-3) or the descriptions of potential privacy invasive actions do not include surveillance activity but do include sensitive data collection associated with target application 114 (i.e., an "F" entry in column 1 and a "T" entry in column 2), then a benign category is assigned to target application 114.

As explained in connection with method 300 above, the systems and methods described herein provide for utilizing multiple analysis techniques to distinguish stalkerware from privacy-invasive application types. The systems and methods described herein may categorize privacy-invasive applications by utilizing machine learning classifiers to enable program analysis techniques (i.e., static and/or dynamic), along with an analysis of mobile application self-descriptions/advertisements from an application marketplace or websites, to distinguish between benign applications, stalkerware applications, and/or other classes of privacy-invasive applications to establish intent. By utilizing the aforementioned analysis techniques in this way, the systems and methods herein may disambiguate between multiple privacy-invasive and other forms of heavy data collection applications to assist users through the use of precise malicious application warnings. Thus, the systems and methods described herein provide an advantage over traditional approaches for detecting privacy-invasive applications, which are often limited to only delivering notifications of these applications without identifying specific application categories.

Figure 6:
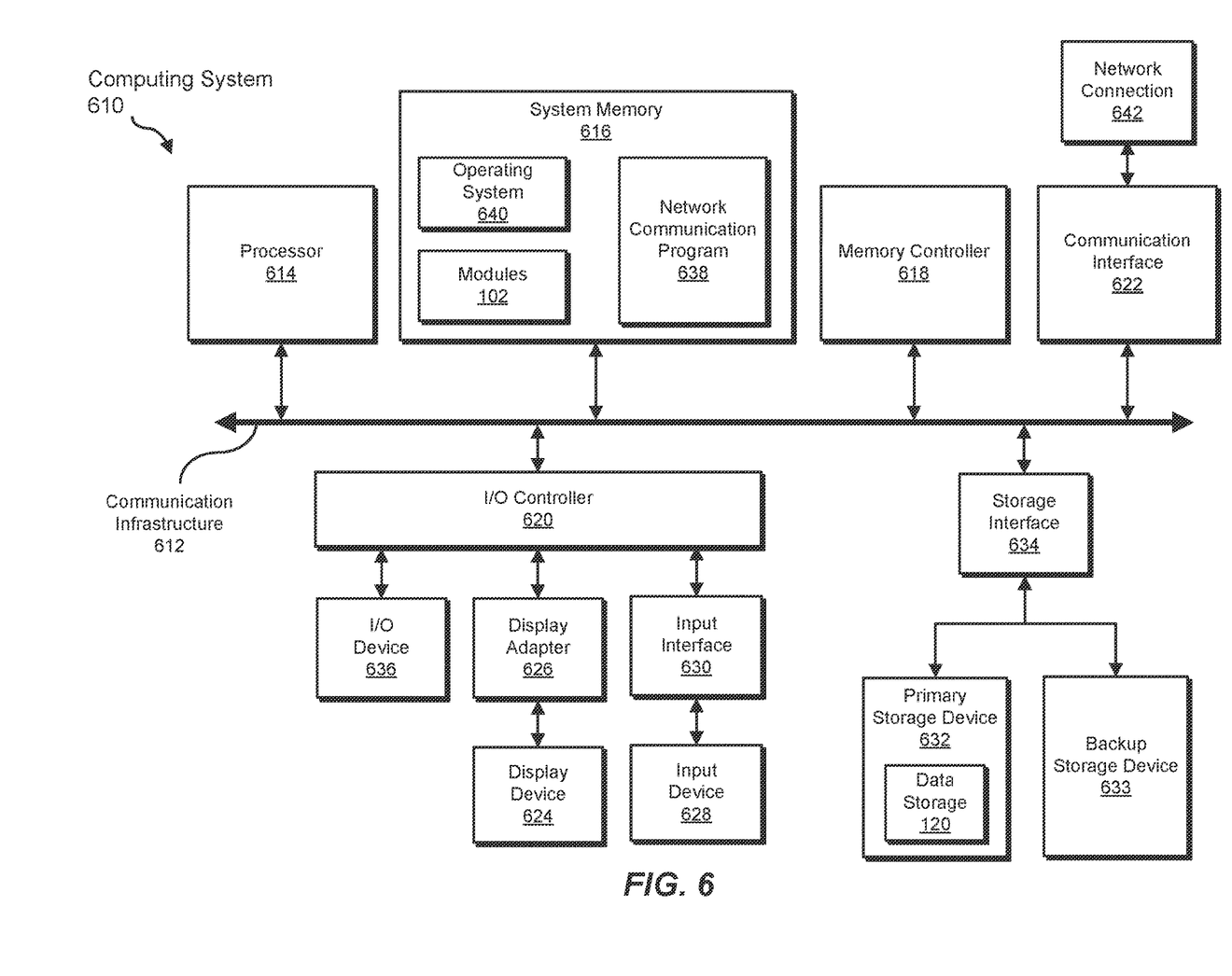
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, [data storage 120] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
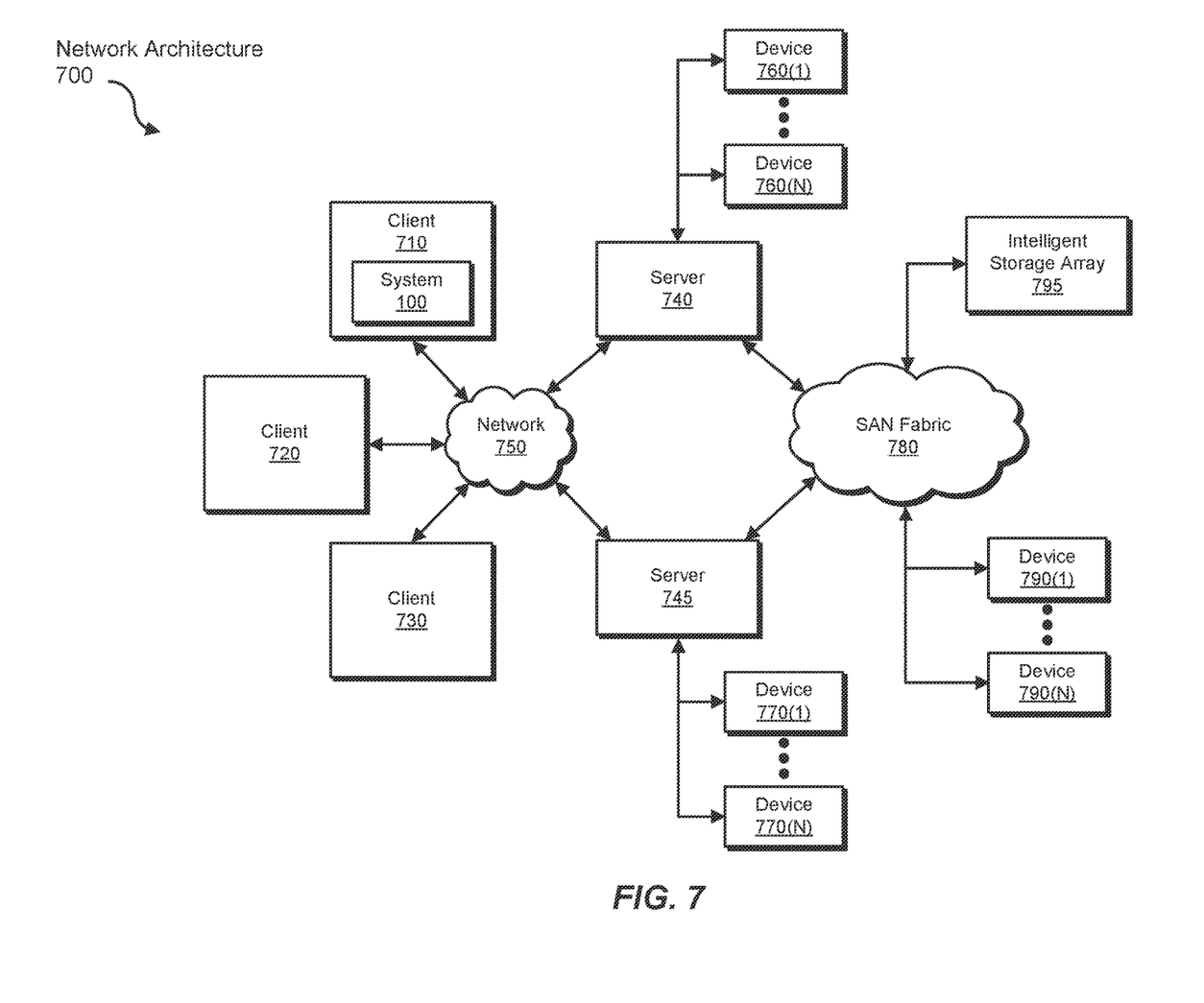
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing multiple analysis techniques to distinguish stalkerware from privacy-invasive application types.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing multiple analysis techniques to distinguish stalkerware from privacy-invasive application types, at least a portion of the method being performed by one or more computing devices comprising at least one processor, the method comprising:
    inspecting, by the one or more computing devices, application package data associated with a target application;
    analyzing, by the one or more computing devices, application marketplace data comprising text and image data for the target application to determine one or more descriptions of potential privacy-invasive actions;
    predicting, by the one or more computing devices and utilizing a program machine learning classifier, one or more sensitive data leaks associated with the target application based on the application package data;
    predicting, by the one or more computing devices and utilizing a marketplace data machine learning classifier, surveillance activities associated with the target application based on the one or more descriptions of the potential privacy-invasive actions; and
    performing, by the one or more computing devices, a security action that assigns a privacy invasion category to the target application based on the predicted one or more sensitive data leaks and the predicted surveillance activities to distinguish the target application from among a plurality of invasive application types comprising stalkerware and other privacy invasion application types.

2. The computer-implemented method of claim 1, wherein inspecting the application package data associated with the target application comprises inspecting target application source code and target application libraries utilized for providing target application functionality.

3. The computer-implemented method of claim 2, wherein analyzing the application marketplace data for the target application to determine the one or more descriptions of privacy-invasive actions comprises analyzing at least one of:
    target application titles;
    target application descriptions;
    target application screenshots; or
    target application developer information.

4. The computer-implemented method of claim 1, wherein the one or more descriptions of the privacy-invasive actions comprise at least one of surveillance actions and personal data collection.

5. The computer-implemented method of claim 1, wherein predicting the one or more sensitive data leaks associated with the target application based on the application package data comprises determining a privacy information type associated with the one or more sensitive data leaks.

6. The computer-implemented method of claim 1, wherein predicting the surveillance activities associated with the target application based on the one or more descriptions of the potential privacy-invasive actions comprises:
    identifying a sensitive data collection action in the one or more descriptions of the potential privacy-invasive actions; and
    determining a privacy information type associated with sensitive data collection action.

7. The computer-implemented method of claim 1, wherein performing the security action that assigns a privacy invasion category to the target application comprises: determining whether the one or more descriptions of the potential privacy-invasive actions include surveillance activity; determining whether the descriptions of the potential privacy-invasive actions include sensitive data collection and identify sensitive data types; and determining whether the one or more sensitive data leaks are associated with the target application.

8. The computer-implemented method of claim 7, wherein the security action assigns a stalkerware category to the target application upon determining that the one or more descriptions of the potential privacy-invasive actions include the surveillance activity and determining that the one or more sensitive data leaks are associated with the target application.

9. The computer-implemented method of claim 7, wherein the security action assigns a fake surveillance application category to the target application upon determining that the one or more descriptions of the potential privacy-invasive actions include the surveillance activity and determining that the one or more sensitive data leaks are not associated with the target application.

10. The computer-implemented method of claim 7, wherein the security action assigns a spyware category to the target application upon determining that the one or more descriptions of the potential privacy-invasive actions do not include the surveillance activity, determining that the one or more descriptions of the potential privacy-invasive actions do not include sensitive data collection, and determining that the one or more sensitive data leaks are associated with the target application.

11. A system for utilizing multiple analysis techniques to distinguish stalkerware from privacy-invasive application types, the system comprising:
at least one physical processor;
physical memory comprising computer-executable instructions and one or more modules that, when executed by the physical processor, cause the physical processor to:
inspect, by an inspection module, application package data associated with a target application;
analyze, by an analysis module, application marketplace data comprising text and image data for the target application to determine one or more descriptions of potential privacy-invasive actions;
predict, by a program machine learning classification module, one or more sensitive data leaks associated with the target application based on the application package data;
predict, by a marketplace data machine learning classification module, surveillance activities associated with the target application based on the one or more descriptions of the potential privacy-invasive actions; and
perform, by a security module, a security action that assigns a privacy invasion category to the target application based on the predicted one or more sensitive data leaks and the predicted surveillance activities to distinguish the target application from among a plurality of invasive application types comprising stalkerware and other privacy invasion application types.

12. The system of claim 11, wherein the inspection module inspects the application package data associated with the target application by inspecting target application source code and target application libraries utilized for providing target application functionality.

13. The system of claim 11, wherein the analysis module analyzes the application marketplace data for the target application to determine the one or more descriptions of privacy-invasive actions by analyzing at least one of:
target application titles;
target application descriptions;
target application screenshots; or
target application developer information.

14. The system of claim 11, wherein the one or more descriptions of the privacy-invasive actions comprise at least one of surveillance actions and personal data collection.

15. The system claim 11, wherein the program machine learning classification module predicts the one or more sensitive data leaks associated with the target application based on the application package data by determining a privacy information type associated with the one or more sensitive data leaks.

16. The system of claim 11, wherein the marketplace machine classification module predicts the surveillance activities associated with the target application based on the one or more descriptions of the potential privacy-invasive actions by:
identifying a sensitive data collection action in the one or more descriptions of the potential privacy-invasive actions; and
determining a privacy information type associated with sensitive data collection action.

17. The system of claim 11, wherein the security module performs the security action that assigns a privacy invasion category to the target application by: determining whether the one or more descriptions of the potential privacy-invasive actions include surveillance activity; determining whether the descriptions of the potential privacy-invasive actions include sensitive data collection and identify sensitive data types; and determining whether the one or more sensitive data leaks are associated with the target application.

18. The system of claim 17, wherein the security module assigns a stalkerware category to the target application upon determining that the one or more descriptions of the potential privacy-invasive actions include the surveillance activity and determining that the one or more sensitive data leaks are associated with the target application.

19. The system of claim 17, wherein the security module assigns a fake surveillance application category to the target application upon determining that the one or more descriptions of the potential privacy-invasive actions include the surveillance activity and determining that the one or more sensitive data leaks are not associated with the target application.

20. A non-transitory computer-readable medium comprising one or more computer-executable instructions that, when executed by at least one processor of a computing device, cause the computing device to:
inspect application package data associated with a target application;
analyze application marketplace data comprising text and image data for the target application to determine one or more descriptions of potential privacy-invasive actions;
predict, utilizing a program machine learning classifier, one or more sensitive data leaks associated with the target application based on the application package data;
predict, utilizing a marketplace data machine learning classifier, surveillance activities associated with the target application based on the one or more descriptions of the potential privacy-invasive actions; and
perform a security action that assigns a privacy invasion category to the target application based on the predicted one or more sensitive data leaks and the predicted surveillance activities to distinguish the target application from among a plurality of invasive application types comprising stalkerware and other privacy invasion application types.

* * * * *